(12) United States Patent  (10) Patent No.: US 7,814,015 B2
Benedyk et al.  (45) Date of Patent: Oct. 12, 2010

(54) METHODS AND SYSTEMS FOR PERFORMING A SALES TRANSACTION USING A MOBILE COMMUNICATIONS DEVICE

(75) Inventors: Robby Darren Benedyk, Raleigh, NC (US); Cory Andrew Grant, Apex, NC (US); Peter Joseph Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 1025 days.

(21) Appl. No.: 10/441,395

(22) Filed: May 20, 2003

(65) Prior Publication Data

US 2005/0033684 A1  Feb. 10, 2005

Related U.S. Application Data

(60) Provisional application No. 60/382,211, filed on May 21, 2002.

(51) Int. Cl.
*G06Q 40/00* (2006.01)
(52) U.S. Cl. .......................................... 705/41; 705/34
(58) Field of Classification Search .................. 705/41, 705/1, 39, 27, 40, 18, 67, 44, 26; 235/382; 380/270; 455/406
See application file for complete search history.

(56) References Cited

U.S. PATENT DOCUMENTS 5,878,337 A * 3/1999 Joao et al. ................... 455/406

(Continued)

FOREIGN PATENT DOCUMENTS

EP  1 178 444 A1  2/2002

(Continued)

OTHER PUBLICATIONS

Reuters Staff, "European Mobile Groups Form M-Payment Intermediary," http://www.totaltele.com/view.asp?ArticleID=94797&Pub=tt, p. 1 (Feb. 26, 2003).

(Continued)

*Primary Examiner*—Jagdish N Patel
*Assistant Examiner*—Kevin Poe
(74) *Attorney, Agent, or Firm*—Jenkins, Wilson, Taylor & Hunt, P.A.

(57) ABSTRACT

Methods and systems for performing sales transactions using a mobile communications device and without requiring text messaging or paging services are disclosed. In one example, a subscriber desiring to purchase goods or services proceeds to a point of sale device where the purchase price for the goods or services is totaled. The subscriber then initiates a voice call with a central transaction server. The subscriber provides a point of sale device identifier and the purchase price to the central transaction server. The central transaction server contacts a local transaction server using the identifier provided by the subscriber. The central transaction server also prompts the subscriber to select the payment account for the transaction and verifies that the subscriber has sufficient credit to purchase the goods or services. The central transaction server locates a pending transaction entry in a database local to the point of sale using the device identifier provided by the subscriber. Upon locating the pending transaction entry and verifying that the subscriber has sufficient credit, the central transaction server notifies the subscriber and the point of sale device that the transaction is complete.

30 Claims, 3 Drawing Sheets

U.S. PATENT DOCUMENTS

| | | | |
|---|---|---|---|
| 5,983,094 A | 11/1999 | Altschul et al. | |
| 6,182,052 B1* | 1/2001 | Fulton et al. | 705/26 |
| 6,195,541 B1 | 2/2001 | Griffith | |
| 6,195,542 B1 | 2/2001 | Griffith | |
| 6,282,566 B1 | 8/2001 | Lee, Jr. et al. | |
| 6,356,752 B1 | 3/2002 | Griffith | |
| 6,434,530 B1 | 8/2002 | Sloane et al. | |
| 6,535,726 B1* | 3/2003 | Johnson | 455/406 |
| 7,050,549 B2 | 5/2006 | Hannigan | |
| 2001/0007983 A1* | 7/2001 | Lee | 705/69 |
| 2001/0049636 A1 | 12/2001 | Hudda et al. | |
| 2002/0025796 A1 | 2/2002 | Taylor et al. | |
| 2002/0029175 A1 | 3/2002 | Yabuta et al. | |
| 2002/0029193 A1 | 3/2002 | Ranjan et al. | |
| 2002/0073029 A1 | 6/2002 | Cheaib et al. | |
| 2002/0143634 A1 | 10/2002 | Kumar et al. | |
| 2002/0152179 A1 | 10/2002 | Racov | |
| 2002/0156729 A1 | 10/2002 | Nilson | |
| 2002/0181710 A1* | 12/2002 | Adam et al. | 380/270 |
| 2002/0190124 A1 | 12/2002 | Piotrowski | |
| 2003/0004879 A1 | 1/2003 | Demoff et al. | |
| 2003/0069844 A1* | 4/2003 | Koren | 705/40 |
| 2003/0074328 A1* | 4/2003 | Schiff et al. | 705/75 |
| 2003/0093334 A1* | 5/2003 | Barzilay | 705/26 |
| 2003/0149662 A1 | 8/2003 | Shore | |
| 2006/0004656 A1* | 1/2006 | Lee | 705/39 |

FOREIGN PATENT DOCUMENTS

| | | | |
|---|---|---|---|
| JP | 2002251587 A | | 9/2002 |
| WO | WO 98/47116 | * | 4/1998 |
| WO | WO 9847116 A1 | * | 10/1998 |
| WO | WO 99/08218 A1 | | 2/1999 |
| WO | WO 01/53977 A2 | | 7/2001 |

OTHER PUBLICATIONS

Communication pursuant to Article 94(3) EPC for European Application No. 03755400.3 (Jun. 22, 2010).

Supplemental European Search Report for European Application No, 03755400.3 (Feb. 9, 2010).

"Simple Object Access Protocol (SOAP) 1.1," W3C Note, http://www.w3.org/TR/2000/NOTE-SOAP-2000508 (May 8, 2000).

Handley et al., "SIP: Session Initiation Protocol," Network Working Group, RFC 2543, pp. 1-153 (Mar. 1999).

Handley et al., "SDP: Session Description Protocol," Network Working Group, RFC 2327 (Apr. 1998).

* cited by examiner

METHODS AND SYSTEMS FOR PERFORMING A SALES TRANSACTION USING A MOBILE COMMUNICATIONS DEVICE

PRIORITY APPLICATION INFORMATION

This application claims the benefit of U.S. Provisional Patent Application No. 60/382,211 filed May 21, 2002, the disclosure of which is incorporated herein by reference in its entirety.

TECHNICAL FIELD

The present invention relates generally to methods and systems for enabling a mobile communications service subscriber to purchase goods and services using a mobile communications device. More particularly, the present invention relates to methods and systems for paying for goods or services using a mobile communications device without requiring text messaging or paging service.

BACKGROUND ART

As the popularity of mobile telephone service has grown, so has competition among mobile network operators to attract potential subscribers. Increasingly, mobile service providers are searching for newer and better services to offer their existing and potential customer base. One such service is the ability to use a mobile communications device to purchase consumer goods or services. While numerous systems and techniques have been proposed to facilitate sales transactions using a mobile communications device, these systems require the sending of one or more transaction identifiers to the mobile communications device during the course of a sales transaction. Consequently, the mobile communications device must be capable of receiving, visually displaying, and responding to such transaction identifiers. Establishing and maintaining such an interactive session with a mobile device user is complex from a technical standpoint and cumbersome from an end user standpoint. For example, many end users may not subscribe to text messaging or paging services and thus be unable to complete a transaction. Moreover, some subscribers that do subscribe to these advanced services may not know how to use these services.

Accordingly, there exists a need for improved methods and systems for performing sales transactions using a mobile communications device that reduces the burden on the end user.

DISCLOSURE OF THE INVENTION

The present invention includes methods and systems for using a mobile communications device to complete a sales transaction without requiring the user to subscribe to advanced services, such as text messaging or paging services. A service, referred to herein as CellPay service, interacts with a vendor to purchase goods or services without requiring the user to carry cash, a check, or a credit card. In order to access the CellPay service, a wireless or mobile telephone service subscriber dials a telephone number associated with a central transaction server. The central transaction server may include an interactive voice response (IVR) interface for prompting the user for information regarding the transaction. For example, the IVR interface may obtain a purchase price, payment information, and a sales device ID from the user. The central transaction server may use the sales device ID to contact a local transaction server at the point of sale. Because the sales device ID is communicated to the central transaction server, prior connection with local transaction server is not required. As a result, bandwidth and central transaction server resources are conserved.

Using the sales device ID and the purchase price, the central transaction server locates the pending transaction in a database managed by the local transaction server. Provided that a matching entry is located in the local database and the subscriber has sufficient credit to cover the purchase price, the central transaction server completes the transaction and notifies the subscriber of the completion. Thus, the present invention completes the sales transaction without requiring text messaging or paging services. All that the user is required to do is provide information to the central transaction server over a voice call. In addition, because the information provided by the user includes the store location, no prior connection between the central and local transaction servers is required.

According to another aspect of the invention, the CellPay system enables commercial entities other than traditional credit card issuers to offer credit services to mobile communications network subscribers. The signaling nodes and databases required to perform a CellPay transaction may be managed by a mobile communications service provider. As a result, a mobile communications service provider can provide credit services to mobile subscribers using the CellPay infrastructure. Allowing mobile service providers to provide credit to mobile subscribers for the purchase of goods and services creates new business opportunities for mobile service providers.

Accordingly, it is an object of the present invention to provide a system and method of enabling a mobile telephone service subscriber provide payment for a sales transaction using a voice response or dialing keypad interface.

It is another object of the present invention to enable mobile telecommunications service providers to provide credit or deposit account services to mobile subscribers It is another object of the present invention to provide a mobile telecommunications network subscriber with a method and system for performing a sales transaction without requiring the transmission of a transaction identifier to the mobile subscriber's handset.

Some of the objects of the invention having been stated hereinabove, other objects will be evident as the description proceeds, when taken in connection with the accompanying drawings as best described hereinbelow.

BRIEF DESCRIPTION OF THE DRAWINGS

A description of the present invention will now proceed with reference to the accompanying drawings of which.

DETAILED DESCRIPTION OF THE INVENTION

Figure 1:
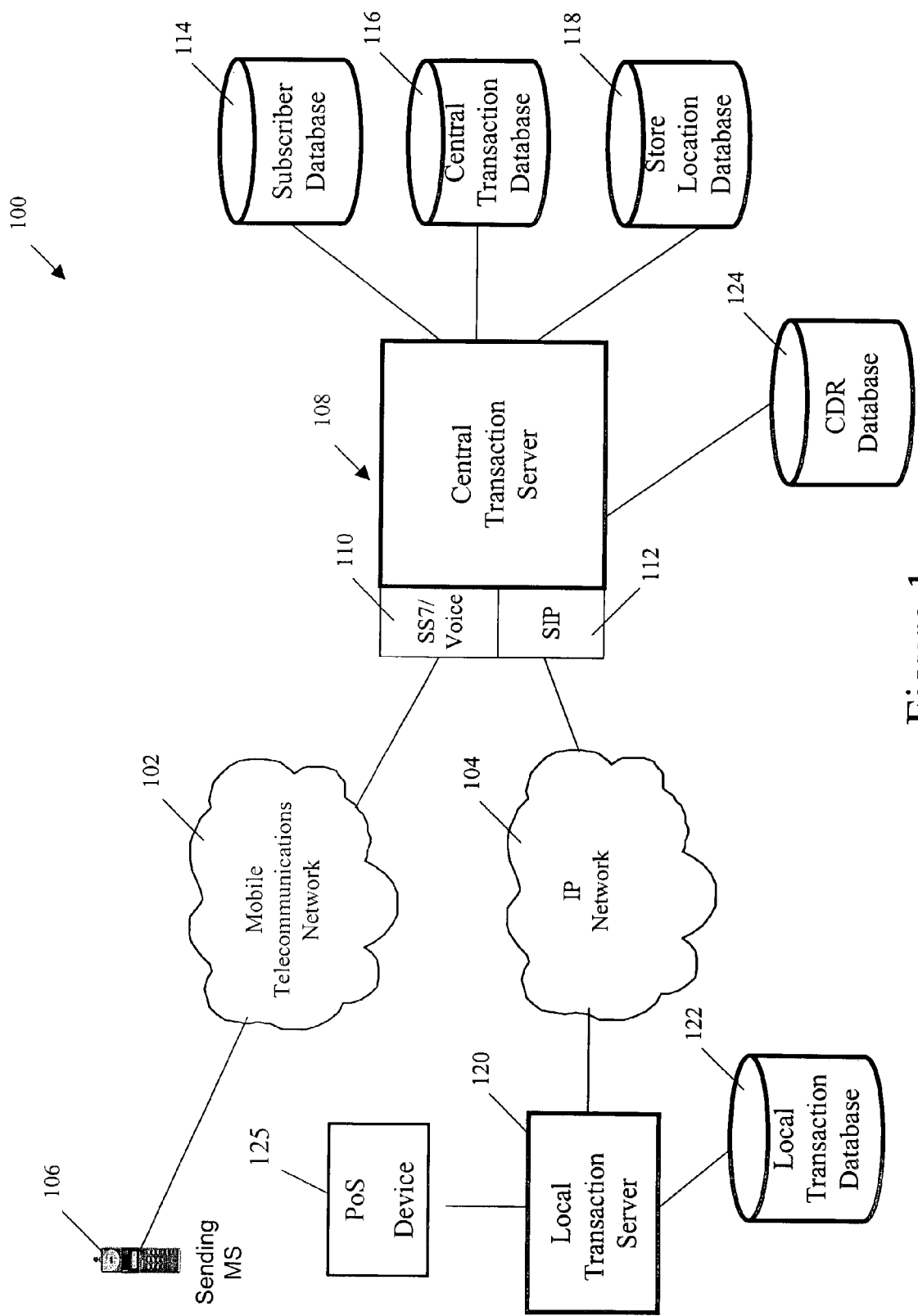
FIG. 1 is a network diagram illustrating a sales transaction system according to an embodiment of the present invention.

FIG. 1 illustrates a mobile-communications-based transaction system according to an embodiment of the present invention. Referring to FIG. 1, a communications network environment 100 includes a mobile telecommunications network 102 and a data network 104. Mobile telecommunications network 102 may be a global system for mobile communication (GSM) network, an interim standard 41 (IS-41) network, or any other type of mobile telecommunications network. In mobile communications network 102, the signaling system 7 (SS7) protocol may be used to facilitate call setup and teardown operations associated with communications to or from a mobile telecommunications service subscriber 106. Alternatively, non-SS7 call signaling protocols, such as session initiation protocol (SIP) and H.323, may be deployed in mobile telecommunications network 102. The present invention is not limited to any specific signaling protocol. Any suitable SS7 or non-SS7 protocol that can be used to establish and tear down calls is intended to be within the scope of the invention.

Data network 104 may be any suitable packet network capable of carrying sales transaction information. In one example, data network 104 may be an Internet protocol (IP)-based network, such as an IP wide area network (WAN). However, the transaction system of the present invention is not limited to any one particular data network protocol. Any suitable network layer and physical layer protocols, such as IP over Ethernet, IP over SONET, IP over ATM or other network layer protocol over any of the referenced physical layer protocols, are intended to be within the scope of the invention.

In FIG. 1, a central transaction server 108 is connected to networks 102 and 104. An SS7/voice interface 110 may be used to communicate with a mobile subscriber over mobile communications network 102. A SIP interface 112 may be used to communicate over data network 104. In one embodiment, SS7/voice interface 110 transmits and receives SS7 application data over network 102 using the SS7 message transfer part (MTP) protocol. In an alternate embodiment, SS7/voice interface 110 may communicate SS7 application data over an IP network using an SS7 adaptation layer, such as transport adapter layer interface (TALI), M3UA, M2UA, M2PA, or SUA, as described in the correspondingly named IETF Internet Drafts and RFCs. These SS7 adaptation layers may be used by interface 110 to transmit and receive messages over an IP-based communication link, such as transmission control protocol (TCP), user datagram protocol (UDP), or stream control transmission protocol (SCTP).

In addition to voice messages, SS7/voice interface 110 may also transmit and receive the voice information necessary to support an interactive voice response (IVR) application component associated with central transaction server 108. Any suitable IVR interface may be used to prompt the subscriber for information regarding the sales transaction. It is understood that such an interface may include a pre-recorded or computer generated voice for prompting the user for information and a speech-to-text converter for converting data spoken by the user into the mobile communications handset into text or other computer-readable format. Such an IVR interface may also include hardware and/or software for converting DTMF digits entered by the user via the mobile communications handset into text or other computer-readable format. For purposes of explaining the present invention, it is assumed that upon dialing a telephone number associated the CellPay system, a mobile subscriber is connected to an IVR interface associated with central transaction server 108 that prompts the mobile subscriber to enter or provide information. SIP interface 112 transmits and receives SIP signaling messages using TCP or SCTP to set up the IVR session between the mobile subscriber and central transaction server 108.

Central transaction server 108 may include one or more databases for providing CellPay service. In the illustrated example, these databases include a CellPay service subscriber database 114, a central transaction database 116, and a store locator database 118. CellPay service subscriber database 114 subscriber specific information for performing a valid sales secure manner. Table 1 shown below illustrates an example of may be contained in CellPay service subscriber database 114.

TABLE 1

Subscriber Account Database Information

| Subscriber ID | PIN | Credit/Deposit Account ID | Available Credit | Maximum Daily Purchase | Account Freeze |
|---|---|---|---|---|---|
| 9194691300 | 4345 | 1 (CREDIT CARD ACCOUNT A) | $3345.33 | $1000.00 | No |
| 9194691300 | 4345 | 2 (MOBILE SERVICE PROVIDER CREDIT ACCOUNT) | $2000.00 | $500.00 | No |
| 9193457012 | 5467 | 1 (CREDIT CARD ACCOUNT A) | $563.67 | $2500.00 | Yes |
| 9193457894 | 5432 | 1 (CREDIT CARD ACCOUNT A) | $587.87 | $5000.00 | No |

In Table 1, each entry includes a subscriber identifier (e.g., a telephone number, a mobile subscriber ISDN number, a mobile directory number, etc.), a password or personal identification number (PIN) for use during authentication processing, a credit or deposit account identifier, an available credit value, a maximum credit limit value, and an account status indicator for securing a credit amount in the event that fraudulent purchasing activity is detected or suspected. The account status or freeze parameter may be used to prevent processing of a sales transaction if fraudulent activity or credit account delinquency is reported.

Central transaction database 116 may maintain pending and processed CellPay transaction records. Table 2 shown below illustrates an example of information that may be contained in central transaction database 116.

TABLE 2

Central Transaction Database Information

| Timestamp | | Transaction Data | | | | Confirmation |
| --- | --- | --- | --- | --- | --- | --- |
| Date | Time | Subscriber ID | Store ID | Purchase Amount | Account ID | ID |
| Dec. 01, 2000 | 13:02:44 | 9194691300 | 100001 | $243.34 | CREDIT CARD ACCOUNT A | 32344322 |
| Dec. 01, 2000 | 13:06:47 | 9193457012 | 100002 | $34.43 | CREDIT CARD ACCOUNT B | 154665544 |
| Dec. 01, 2000 | 15:16:21 | 9194691300 | 100003 | $563.23 | MOBILE SERVICE PROVIDER CREDIT ACCOUNT | pending |

In Table 2, each entry includes date and time information, a subscriber identifier, a selling agent or store identifier, a transaction purchase amount, a credit account identifier, and a transaction confirmation identifier. The date and time information may represent the date and time at which a subscriber contacted central transaction server 108 to perform a particular sales transaction. The subscriber ID may be a directory number extracted from signaling messages used to establish a connection between the subscriber and central transaction server 108. The store ID, the purchase amount, and the account ID may be entered by the subscriber via the subscriber's mobile communications handset. The confirmation ID may store a confirmation number for completed transactions or a confirmation pending identifier for pending transactions.

Store locator database 118 may maintain information associated with sales agents or stores that support CellPay transactions. Table 3 shown below illustrates exemplary data that may be stored in store locator database 118.

TABLE 3

Store Locator Database Information

| Store/Sales Device ID | Server Address | Signaling Protocol | Data Protocol | Encryption Key |
| --- | --- | --- | --- | --- |
| 100001 | 101.22.2.23 | SIP | XML | Data |
| 200001 | 101.22.3.11 | SIP | XML | Data |
| 300001 | 101.22.5.12 | SIP | XML | Data |

In Table 3, each entry includes a sales agent or store identifier, a network address associated with the store's local transaction server, the signaling protocol used to communicate with the store's local CellPay application, the data protocol used by the store's local CellPay application, and encryption information. The store/sales identifier device stores a value that uniquely identifies the store and sales terminal within a store. Such values may be provisioned in store locator database 118 for all stores that allow payment through the CellPay system. The server address may be an IP address, a SIP URL, or other address for contacting local transaction server 120. The signaling protocol indicator in each filed indicates the signaling protocol used to establish a connection with local transaction server 120. The data protocol indicator in each entry includes the format that local transaction server 120 uses to represent data. Finally, the encryption information in each field may store an encryption key, such as the public encryption key, of each local transaction server 120.

In the example illustrated in FIG. 1, local transaction server 120 and local CellPay transaction database 122 may be connected to central transaction server 108 via SIP interface 112 over data network 104. Local transaction server 120 and local transaction database 122 may maintain sales transaction information associated with sales that have occurred at the store served by the local server and database. In the embodiment illustrated in FIG. 1, communication between the central transaction server 108 and local transaction server 120 may be established using the SIP signaling protocol. However, the present invention is not limited to using the SIP protocol for communications between central transaction server 108 and local transaction server 120. Any suitable protocol for establishing a communications session between central transaction server 108 and local transaction server 120 is intended to be within the scope of the invention.

Local transaction database 122 may maintain information associated with a CellPay transaction. Table 4 shown below illustrates is an example of information that may be contained in a local transaction database 122.

TABLE 4

Store Transaction Database Information

| Timestamp | | Store/Sales Device ID | Transaction Data | |
| --- | --- | --- | --- | --- |
| Date | Time | | Purchase Price | Confirmation ID |
| Dec. 01, 2000 | 13:01:24 | 100001 | $243.34 | 34223443 |
| Dec. 01, 2000 | 13:04:27 | 100002 | $34.43 | 75456767 |
| Dec. 01, 2000 | 15:13:54 | 100003 | $563.23 | pending |

In Table 4, each entry includes date and time information, a store/sales device identifier, purchase price information, and a transaction confirmation identifier. The date and time information field stores the time at which a particular transaction occurred. The store/sales device ID field stores an identifier for the store and sales terminal at which the purchase occurred. The purchase price field stores the price or amount due for the purchase. The confirmation identifier field stores a value generated by local transaction server 120 to confirm a transaction.

Although the embodiment illustrated in FIG. 1 includes both a central transaction server and a local transaction server, the present invention is not limited to such an embodiment. In an alternate embodiment, the functions performed by central and local transaction servers 108 and 120 may be combined in a server in a single location. In such an embodiment, if the single transaction server is centrally located, point of sale devices may communicate transaction information directly to the central transaction server.

In one embodiment, central transaction server 108 may copy information from signaling messages associated with a CellPay transaction and generate call detail records (CDRs). Table 5 shown below illustrates exemplary CDR data that may be generated by central transaction server 108.

TABLE 5

CDR Information

| Timestamp | | CDR Data | |
|---|---|---|---|
| Date | Time | Subscriber ID | Carrier ID |
| Dec. 01, 2000 | 13:02:42 | 9194691300 | 221 |
| Dec. 01, 2000 | 13:06:42 | 9193457012 | 636 |
| Dec. 01, 2000 | 13:16:13 | 9193457894 | 221 |

As indicated in Table 5 an exemplary CDR associated with a CellPay transaction may include date and time information indicating the date and time of each transaction, a mobile subscriber identifier, and a network service provider or carrier identifier. These CDRs may be stored in a CDR database 124 and utilized for various purposes, such as billing, billing verification, fraud detection, etc. For example, the data in CDR database 124 may be used to bill a telecommunications subscriber and/or a telecommunications service provider for usage of the telecommunications network for the CellPay transaction.

In the example illustrated in FIG. 1, a point of sale (PoS) device 125 may be connected to local transaction server 120 to total the purchase price of goods or services purchased by the mobile subscriber. PoS device 125 may include a conventional cash register with a calculator and an LCD or LED screen for displaying the purchase price and sales device ID to the subscriber. In addition, PoS device 125 may include a network interface for communicating with local transaction server 120.

CellPay System Operation

Figure 2:
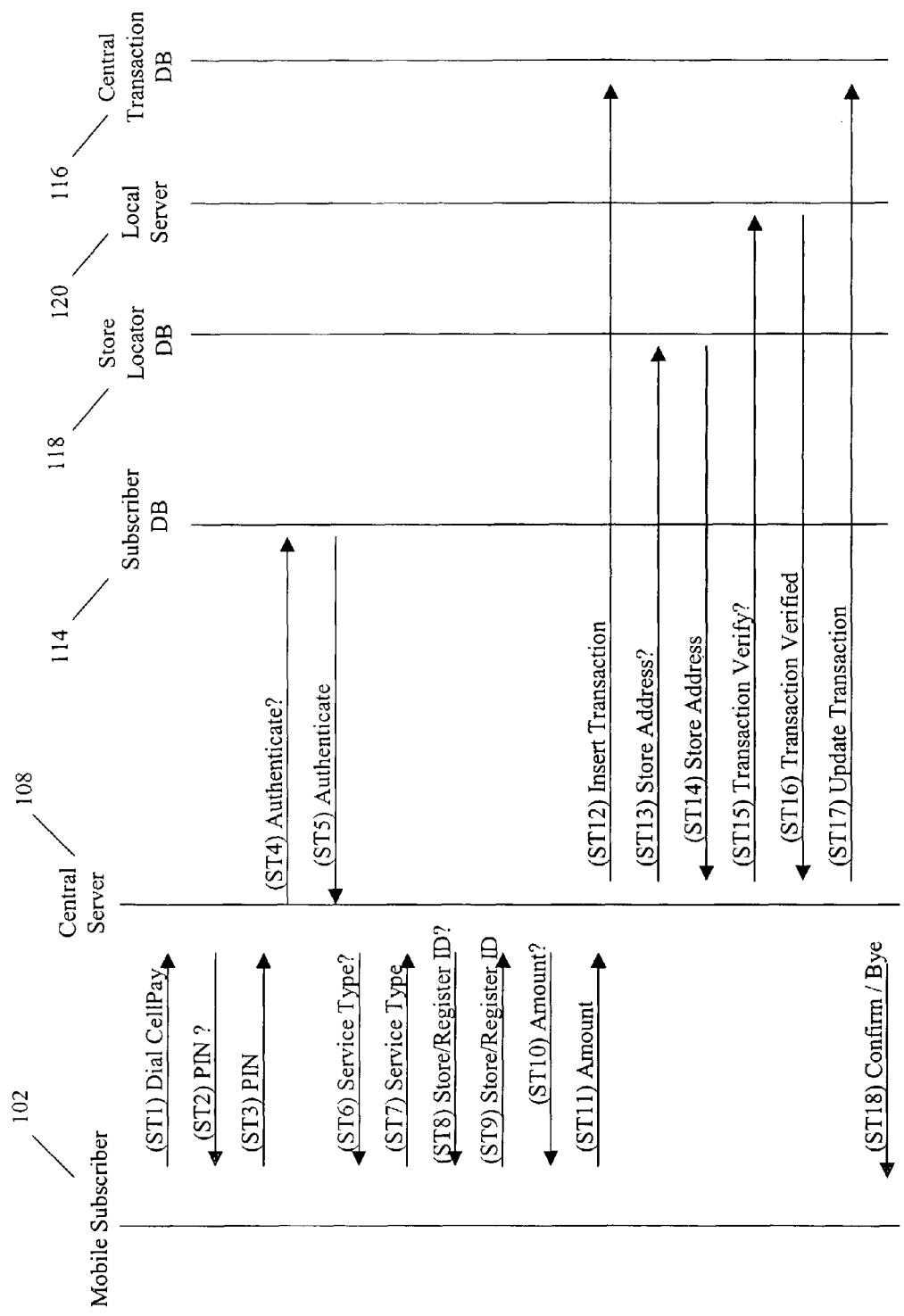
FIG. 2 is a process and information flow diagram associated with a mobile-telecommunications-based sales transaction according to an embodiment of the present invention.

FIG. 2 illustrates a message flow associated with an exemplary sales transaction using the CellPay system illustrated in FIG. 1. For purposes of illustration, it is assumed that the mobile subscriber 102 is assigned a mobile telephone number (e.g., an MSISDN) of (919) 469-1300 and that the mobile subscriber is purchasing goods or services from a retailer that supports CellPay transaction service. In a typical retail transaction scenario, mobile subscriber 102 selects the desired goods and/or services to be purchased and proceeds to PoS device 125. PoS device 125 totals the purchase price of the goods and services being purchased by mobile subscriber 102 and communicates the purchase price to the retailer's local transaction server 120. Local transaction server 120 creates a pending transaction entry in database 122 including information similar to that contained in the third record of Table 4. Local transaction server 120 communicates the purchase price of $563.23 to mobile subscriber 102 along with the store/sales device identifier of 100003. For example, the purchase price and the store/sales device identifier may be displayed to the subscriber on a display screen associated with PoS device 125.

The store/sales device identifier is preferably in a form that may be easily entered via the dialing keypad of a mobile subscriber's communication handset. For example, the store/sales device ID may be a predetermined sequence of digits. Alternatively, the identifier may be spoken by a mobile subscriber into the communication handset. In this example, the store/sales device identifier is the six digit alphanumeric string "100003," indicating retailer store 1000 and point of sale device 03. In another alternative, the store/sales device identifier may include information that identifies the particular sales agent involved in the transaction. For example, an identifier string "100003001" may be used to indicate retailer store 1000, point of sale device 03, and sales agent 001. The salesperson identifier allows retailers to create CellPay transaction records that can be used to track the performance of their sales staffs.

Once the purchase price and store/sales device identifier have been provided, mobile subscriber 102 dials a phone number associated with the CellPay transaction service. In one embodiment, mobile subscriber 102 may simply dial his or her own phone number, which is typically used to connect to an IVR system from which the subscriber's voice mail server or CellPay server may be accessed. For example, mobile subscriber 102 may dial (919) 469-1300 and be connected to an IVR interface of central CellPay server 108. The IVR interface may prompt the subscriber to press "1" to access voice mail or press "2" to make a CellPay purchase. The subscriber may enter information via the mobile handset keypad or using spoken commands, depending on whether the IVR interface has voice recognition capability.

Returning to the messaging example shown in FIG. 2, mobile subscriber 102 dials a telephone number that connects mobile subscriber 102 to the CellPay IVR application associated with central transaction server 108, as indicated in step ST1. Mobile subscriber 102 is prompted to enter an authentication code, such as a personal identification number (PIN) or password (ST2). Using the communication handset, mobile subscriber 102 responds with a valid PIN, such as "4345," and authentication processing occurs (ST3). Central transaction server 108 accesses CellPay subscriber information associated with mobile subscriber 102 in subscriber database 114, as indicated in step ST4. The subscriber information accessed may be similar to that contained in entry 1 or entry 2 of Table 1. The authentication information provided by mobile subscriber 102 is verified, and the subscriber is successfully authenticated (ST5). Once authenticated, central transaction server 108 prompts mobile subscriber 102 to select the deposit or credit account against which the purchase charges are to be applied (ST6). In this example, the mobile subscriber may be prompted to press or speak "1" to use his or her credit card account or to press or speak "2" to use his or her credit account with the subscriber's mobile service provider, as indicated in Table 1. Using the mobile communications handset, mobile subscriber 102 responds by pressing the number "2" digit on the telephone keypad (ST7), indicating that the current transaction should be applied against his or her mobile service provider credit account. The mobile subscriber is next prompted to enter the store/sales device identifier associated with the transaction, as indicated in step ST8. Once again, this information may be provided to the mobile subscriber at the time of the transaction. Using the mobile communications handset, mobile subscriber 102 responds by entering the appropriate store/sales device identifier (e.g., 100003) via the telephone keypad (ST9). The mobile subscriber is next prompted to enter the purchase price, as indicated in step ST10. Using the communications handset, mobile subscriber 102 responds by entering the amount of the purchase, $563.23 (ST11).

The mobile subscriber input information collected as well as mobile subscriber identification information is subsequently entered as a pending transaction record in central CellPay transaction database 116, as indicated in step ST12. The pending sales transaction information stored in database 116 may include information similar to that shown in the third entry of Table 2. Using the store/sales device identifier 100003 provided by mobile subscriber 102, central transaction server 108 accesses the store locator database 118 and obtains the information necessary to contact local transaction server 120 that is servicing the pending transaction associated with mobile subscriber 102, as indicated in steps ST13 and ST14. Information similar to that contained in the first entry of Table 3 may be obtained during the store locator database access. Using the local transaction server address obtained from database 118, central transaction server 108 contacts the serving local transaction server 120 and searches local transaction database 122 for a pending transaction entry that matches the pending transaction entry associated with mobile subscriber 102 stored in central CellPay transaction database 116, as indicated in step ST15. The search may be based on the store/sales device ID alone or combination of the store/sales device identifier and the purchase price. Using the store/sales device ID alone or a combination of the purchase price and the device ID to search local store transaction database 122 should yield a unique result, provided that a given point of sale device is only allowed to have a single pending transaction entry in database 122. If multiple pending entries per PoS device are allowed, PoS device 125 or local transaction server 120 may assign a unique identifier to each entry to ensure that the correct transaction is verified. For example, if multiple pending entries are allowed, PoS device 125 may use an additional digit in the store/sales device identifier to distinguish among simultaneously pending transactions at the same sales device.

Figure 3:
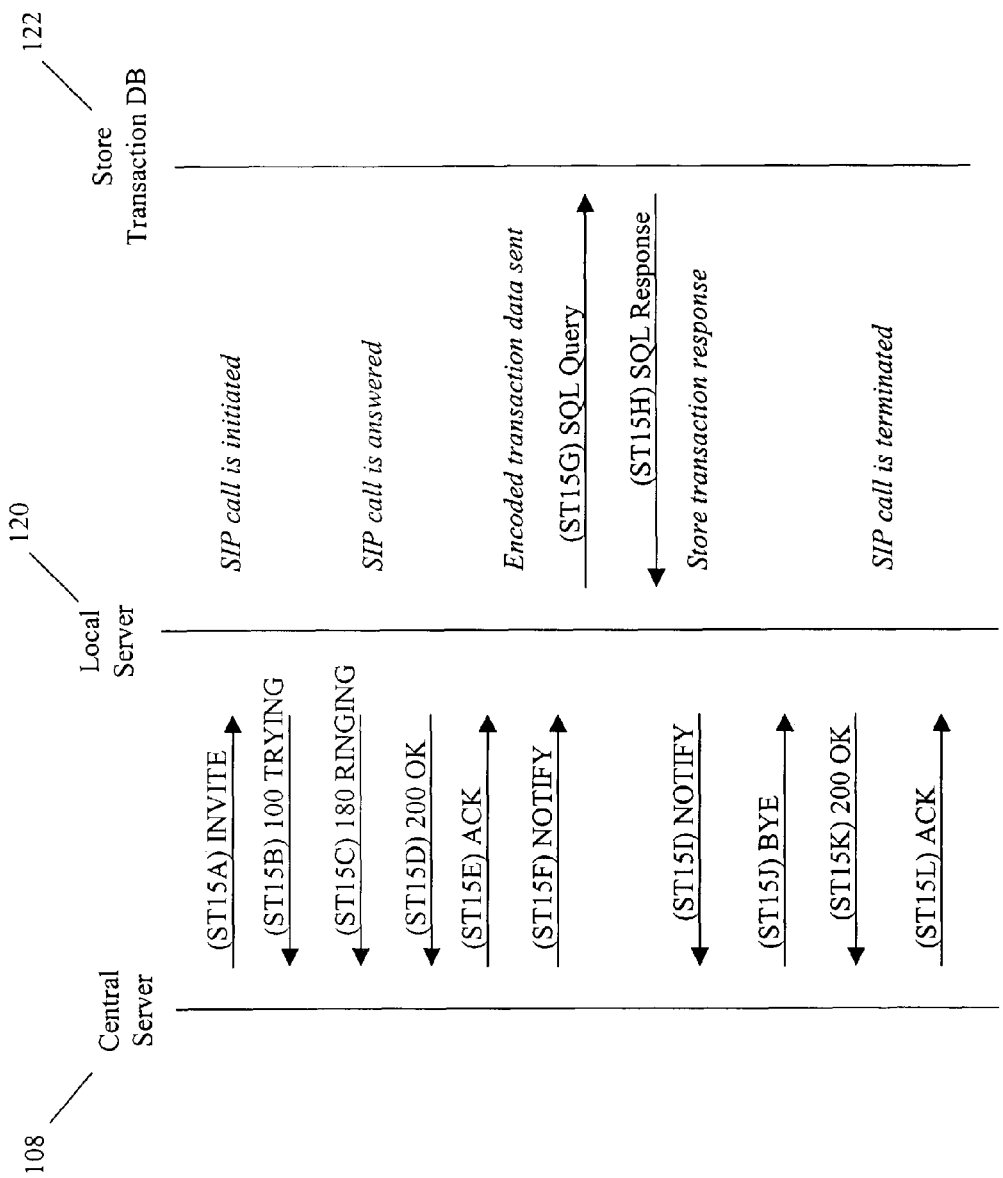
FIG. 3 is a message flow diagram illustrating exemplary session initiation protocol (SIP) messaging for performing a sales transaction according to an embodiment of the present invention.

FIG. 3 is a message flow diagram illustrating exemplary messages that may be used in ST15 of FIG. 2 to verify a sales transaction. In particular, FIG. 3 illustrates communication between central transaction server 108 and local transaction server 120 using the SIP signaling protocol. As described above, central transaction server 108 may obtain a variety of contact information from store locator database 118 including preferred signaling protocol information, preferred data protocol information, encryption/security information, and network address information. In one embodiment, central transaction server 108 exchange pending transaction information with local transaction server 120 using the SIP signaling protocol. The SIP protocol is described in Handley et al., *SIP: Session Initiation Protocol*, Internet Engineering Task Force (IETF) Request for Comments (RFC) 2543, March, 1999, the disclosure of which is incorporated herein by reference in its entirety. A related protocol used to describe sessions between communicating parties is the session description protocol. The session description protocol is described in Handley and Jacobsen, *SDP: Session Description Protocol*, IETF RFC 2327, April 1998, the disclosure of which is incorporated herein by reference in its entirety.

The present invention is not limited to using SIP for communications between central transaction server 108 and local transaction server 120. For example, in an alternate embodiment, the simple object access protocol (SOAP) may be used. SOAP is defined in Simple Object Access Protocol (SOAP) 1.1, W3C Note 8 May 2000, the disclosure of which is incorporated herein by reference in its entirety. Briefly, SOAP is a lightweight protocol for the exchange of messages in a decentralized, distributed environment. SOAP is XML-based and can be used in conjunction with other protocols, such as hypertext transfer protocol (HTTP). Thus, local transaction server 120 illustrated in FIG. 1 may be a web server. Since web servers communicate using HTTP, SOAP and HTTP may be used to communicate transaction payment information to local transaction server 120 and also to communicate the payment verification to central transaction server 108. In embodiments in which SIP is used to initiate a session between central transaction server 108 and local transaction server 120, HTTP-encapsulated XML packets may be carried in the SIP messages for the actual information exchange.

Returning to the SIP message flow diagram of FIG. 3, central transaction server 108 initiates communication with local transaction server 120 using a SIP Invite message in step ST15A. Local transaction server 120 responds to central transaction server 108 with a SIP 100 Trying message, as indicated in step ST15B. Local transaction server 120 then transmits a SIP 180 Ringing message (ST15C), followed by a SIP 200 Ok message (ST15D) to central transaction server 108. In step ST15E, central transaction server 108 responds to the SIP 200 Ok message with a SIP Ack message, thereby completing setup of the SIP communication session. Information associated with the mobile subscriber's pending sales transaction is then communicated from central transaction server 108 to local CellPay server 120 via a SIP Notify message, as indicated in step ST15F. Local transaction server 120 receives the SIP Notify message and formulates an SQL query message using the pending transaction information (ST15G). The SQL query is used to access local store transaction database 122 and determine whether a matching pending transaction entry resides therein. Local store transaction database 122 responds (ST15H), and, in this example, the response indicates that a pending matching entry has been located. In conjunction with providing a positive match response, the pending transaction entry may be updated to indicate a non-pending status. This update may include assigning a unique transaction confirmation identifier to the formerly pending transaction entry.

In any event, in step ST15I, local transaction server 120 formulates a response and transmits the response information to central CellPay server 108 via a SIP Notify message. Central transaction server 108 receives the SIP Notify message and begins to terminate the SIP session by responding with a SIP Bye message, as indicated in step ST15J. In step ST15K, local transaction server 120 responds with a SIP 200 Ok message, which in turn evokes a SIP Ack message from central transaction server 108 (ST15L), thereby terminating the SIP session. As such, the pending transaction associated with mobile subscriber 102 is successfully verified (ST16) and the corresponding transaction entry in central CellPay transaction database 116 is updated to reflect the successful completion of the transaction (ST17). In a manner similar to that described above with respect to local store transaction database 122, the pending transaction entry in central transaction database 116 may be updated to indicate non-pending status. This update may include assigning a transaction confirmation identifier to the formerly pending transaction entry, where the transaction identifier may be the same transaction identifier assigned to the corresponding transaction entry in the local store transaction database.

Also, in instances where credit limits apply, the central transaction database update may include modifying available credit information for the mobile subscriber to reflect the effect of the transaction on the selected credit account. A check may be performed prior to processing a transaction to determine whether the pending transaction will cause the subscriber to exceed his or her available credit. In cases where a pending transaction, if processed, would exceed the available credit for the selected credit account, central transaction server 108 may deny the transaction request and terminate further transaction processing. In this case, the pending transaction record in central transaction database 116 may timeout and be deleted. Alternatively, the record may be saved and marked as a failed transaction attempt. The corresponding pending transaction record in local store transaction database 122 may be treated in a similar manner. Alternatively, central transaction server 108 may prompt the subscriber to select another credit account, assuming the subscriber has more than one credit account to access.

In any event, once the above-described transaction processing is completed, the IVR interface may notify mobile subscriber 102 that the transaction was completed successfully and terminate the telephone call. Local transaction server 120 may notify the point of sale terminal that originated the transaction that the pending transaction was successfully completed.

By using a cashless transaction system of the present invention, a mobile subscriber may complete a transaction at a checkout register without requiring the exchange of hard currency or the physical presence of a credit card or debit card. Furthermore, during the course of the transaction, the mobile subscriber's credit card, debit card, checking, or savings account information may not be transmitted through the mobile communications network and hence is significantly less vulnerable to theft or fraud. Also, the mobile subscriber is free to select any one of a number of credit or deposit accounts for a particular transaction via the CellPay IVR system. As a result of the ease of credit account selection/transactions via a mobile telephone, it may now prove attractive for mobile service providers to offer credit account services to their subscribers in much the same manner as traditional credit card providers. Mobile service providers may also provide checking or savings account services to their subscribers.

Yet another advantage of the present invention is that mobile subscribers are not required to subscribe to text messaging or paging services in order to complete a CellPay transaction. Because the user can complete a purchase over a voice call, specialized text messaging and paging services may not be required. As a result, the system described herein is less complex and more user-friendly than conventional mobile-telephone-based purchasing systems that require such advanced services.

Yet another advantage of the invention is that after authentication, subscribers are preferably only required to provide the store/sales device ID and the purchase price to the central transaction server to complete a transaction. Such information is readily available to the subscriber at the time of purchase and easily entered via a keypad or speaker of a mobile communications handset. However, the present invention is not limited using the purchase price and store/sales device ID to verify and complete a transaction. Any suitable identifier that uniquely identifies a transaction and that allows central transaction server 108 to locate the transaction is intended to be within the scope of the invention.

Yet another advantage of the present invention is that a permanent connection between central transaction server 108 and local transaction server 120 is not required. Because local transaction server 120 communicates the store/sales device ID to central transaction server 108 and because central transaction server 108 locates the local transaction server 120 using database 118, connections between local transaction server 120 and central transaction server 108 can be established on-the-fly for each transaction. As a result, bandwidth in IP network 104 is more efficiently utilized.

It will be understood that various details of the invention may be changed without departing from the scope of the invention. Furthermore, the foregoing description is for the purpose of illustration only, and not for the purpose of limitation—the invention being defined by the claims.

What is claimed is:

1. A system for performing a sales transaction using a mobile communications device, the system comprising:
    (a) a point of sale device for initiating a sales transaction and totaling a purchase price for goods or services being purchased in the sales transaction and for communicating a first instance of the purchase price and a first instance of an identifier to a mobile communications subscriber;
    (b) a local transaction server operatively associated with the point of sale device for storing the first instance of the identifier and the first instance of the purchase price for the transaction; and
    (c) a central transaction server for receiving a voice call from the mobile communications subscriber, for obtaining a second instance of the purchase price, the identifier, and payment account information via the voice call from the subscriber without using text messaging or paging services, and for automatically verifying and completing the transaction by comparing, at the central transaction server, the first instance of the purchase price, the first instance of identifier and the first instance of the payment account information received from the mobile communications subscriber via the voice call and the second instance of the identifier and the second instance of the purchase price stored by the local transaction server.

2. The system of claim 1 wherein the identifier uniquely identifies the point of sale device.

3. The system of claim 2 wherein the central transaction server is adapted to locate the local transaction server using the identifier.

4. The system of claim 3 the central transaction server is adapted to verify the sales transaction by querying a database local to the local transaction server using the identifier as a search key.

5. The system of claim 1 wherein the central transaction server includes an interactive voice response (IVR) interface for prompting the mobile subscriber for the information regarding the sales transaction using audible commands.

6. The system of claim 5 wherein the IVR interface is configured to prompt the mobile subscriber to select a credit account from a predetermined list of credit accounts for supplying payment for the sales transaction.

7. The system of claim 6 wherein the predetermined list of credit accounts includes a mobile service provider credit account.

8. The system of claim 5 wherein the IVR interface is configured to prompt the mobile subscriber to select a deposit account for supplying payment for the sales transaction.

9. The system of claim 1 wherein, in verifying the transaction, the central transaction server is adapted to determine whether the mobile subscriber has sufficient credit in a payment account selected by the subscriber to cover the purchase price.

10. The system of claim 1 comprising a sales transaction database accessible by the central transaction server for storing the identifier and the purchase price.

11. The system of claim 10 wherein the sales transaction database is adapted to store a list of credit accounts usable by the subscriber to pay for transactions made using the mobile communications device.

12. The system of claim 11 wherein the list of credit accounts includes a credit account managed by a mobile service provider whereby the mobile service provider extends credit to the mobile subscriber for the purchase of goods or services.

13. The system of claim 11 wherein the list of credit accounts includes an available credit amount associated with each credit account.

14. The system of claim 1 comprising a store locator database accessible by the central transaction server for storing information for verifying the sales transaction.

15. The system of claim 14 wherein the store locator database includes an entry for mapping the identifier received from the mobile subscriber to a network address for the local transaction server.

16. The system of claim 14 wherein the store locator database includes signaling protocol information indicating a signaling protocol used to contact the local transaction server.

17. The system of claim 1 comprising call detail record (CDR) database accessible by the central transaction server for storing a record of the sales transaction.

18. The system of claim 1 comprising a sales transaction database accessible by the local transaction server for storing the identifier and the purchase price.

19. The system of claim 18 wherein the sales transaction database is accessible by the central transaction server for verifying the sales transaction using the identifier received from the mobile communications subscriber.

20. A method for performing a sales transaction using a mobile communications device, the method comprising:
   (a) at a merchant point of sale (POS) terminal, initiating a sales transaction and totaling a purchase price for goods or services being purchased by a mobile subscriber in a sales transaction;
   (b) communicating a first instance of the purchase price and a first instance of an identifier to the mobile subscriber;
   (c) at a local transaction server operatively associated with the merchant POS terminal storing the first instance of the identifier and the first instance of the purchase price locally to the sales transaction;
   (d) at a central transaction server, obtaining the first instance of the identifier and the purchase price from the local transaction server and receiving a voice telephone call from the mobile subscriber and obtaining, via the voice call and without using text messaging or paging service, a second instance of the identifier and the purchase price and payment information from the mobile subscriber;
   (e) at the central transaction server, automatically comparing the first instance of the identifier obtained from the subscriber with the second instance of the identifier stored locally to the sales transaction; and
   (f) in response to determining that the first instance of the identifier obtained from the local transaction server matches the second instance of the identifier obtained from the mobile subscriber, automatically verifying and completing the sales transaction.

21. The method of claim 20 wherein the identifier uniquely identifies a point of sale device.

22. The method of claim 20 wherein obtaining the identifier and the payment information from the mobile subscriber without using text messaging or paging service includes prompting the mobile subscriber to enter the transaction identifier and the payment information using an interactive voice response (IVR) interface.

23. The method of claim 20 wherein obtaining payment information from the subscriber includes prompting the subscriber to select from a predetermined list of credit and deposit accounts to pay for the transaction.

24. The method of claim 23 wherein the list of credit accounts includes a credit account provided by a mobile communications service provider.

25. The method of claim 20 wherein comparing the identifier received from the subscriber to the identifiers stored locally to the transaction includes initiating a session initiation protocol (SIP) communications session between the central transaction server and a transaction server local to the sales transaction.

26. The method of claim 20 wherein comparing the identifier received from the subscriber to the identifiers stored locally to the transaction includes establishing a simple object access protocol (SOAP) communications session between the central transaction server and a transaction server local to the sales transaction.

27. The method of claim 20 wherein completing the sales transaction includes using hypertext transfer protocol (HTTP) commands to post the transaction payment information to a web server associated with the store transaction system.

28. The method of claim 20 including generating a call detail record (CDR) associated with the voice telephone call.

29. The method of claim 28 comprising billing a telecommunications service provider for the voice telephone call based on the CDR.

30. A method for completing a sales transaction using a mobile communications device, the method comprising:
   (a) initiating a voice call from a mobile communications device to an interactive voice response (IVR) interface associated with a central transaction server;
   (b) communicating a first instance of information relating to a pending sales transaction from the mobile communications device to the central transaction server using the voice call and the IVR interface; and
   (c) at the central transaction server, using the first instance of the information to contact a transaction terminal local to the mobile communications device and automatically compare the first instance of the information received from the mobile communications device with a second instance of the transaction information stored locally to the sales transaction in order to automatically verify and complete the sales transaction.

* * * * *